United States Patent [19]

Weissman

[11] Patent Number: 4,858,198
[45] Date of Patent: Aug. 15, 1989

[54] DETERMINATION OF FORMATION PERMEABILITY FROM AN ACOUSTIC LOG

[75] Inventor: David Weissman, Dallas, Tex.

[73] Assignee: Mobil Oil Corporation, New York, N.Y.

[21] Appl. No.: 156,070

[22] Filed: Feb. 16, 1988

[51] Int. Cl.⁴ .......................... G01V 1/28; G01V 1/40
[52] U.S. Cl. ........................................ 367/31; 367/73; 367/75; 364/422
[58] Field of Search ............................. 367/31, 73, 75; 364/422; 73/152

[56] References Cited

U.S. PATENT DOCUMENTS

| | | | |
|---|---|---|---|
| 3,330,374 | 7/1967 | Broussard et al. | 367/27 |
| 3,524,162 | 8/1970 | Zill | 367/30 |
| 4,399,486 | 7/1983 | Thauffer et al. | 367/73 |
| 4,432,077 | 2/1984 | Alhilali et al. | 367/31 |
| 4,435,977 | 3/1984 | Gournay | 364/422 |
| 4,575,828 | 3/1986 | Williams | 367/75 |
| 4,683,556 | 7/1987 | Willis | 367/33 |
| 4,698,792 | 10/1987 | Kurkjian et al. | 367/31 |

FOREIGN PATENT DOCUMENTS 0131351  1/1985  European Pat. Off. .............. 367/31

OTHER PUBLICATIONS

Williams et al., "The Long Spaced Acoustic Logging Tool," SPWLA 25th Annual Logging Symposium, Jun. 10–13, 1984.

Burns et al., "Inversion of Borehole Guided . . . Values", J. Geophys. Res., vol. 92, No. B-12, PP12713–2J, 11/10/87 abst.

"Chang et al., Effects of In-Situ Permability . . . Borehole," Geophysics, vol. 52, #9, pp. 1279–1289, 9/87; abst.

"Synthetic Microseismograms: Logging in Porous Formations", Geophysics, vol. 39, No. 1, Feb. 1974, pp. 14–32.

"Propagation of Elastic Waves in a Cylindrical Bore Containing a Fluid", Journal of Applied Physics, vol. 23, No. 9, Sep. 1952, pp. 997–1005.

Primary Examiner—Nelson Moskowitz
Attorney, Agent, or Firm—Alexander J. McKillop; Charles J. Speciale; George W. Hager, Jr.

[57] ABSTRACT

A formation surrounding a borehole is traversed with a logging tool employing an acoustic transmitter and a pair of spaced-apart acoustic receivers. Acoustic energy traveling through the formation from the transmitter to the receivers are detected. The energy of tube waves contained within the detected acoustic energy is measured. Such measured tube wave energy is calibrated in response to measurements of tube wave energy ratio carried out in a zone of the formation having zero permeability. This calibrated tube wave energy is transformed into formation permeability in accordance with a measured relationship between permeability and tube wave energy ratio.

5 Claims, 5 Drawing Sheets

FIG. 1
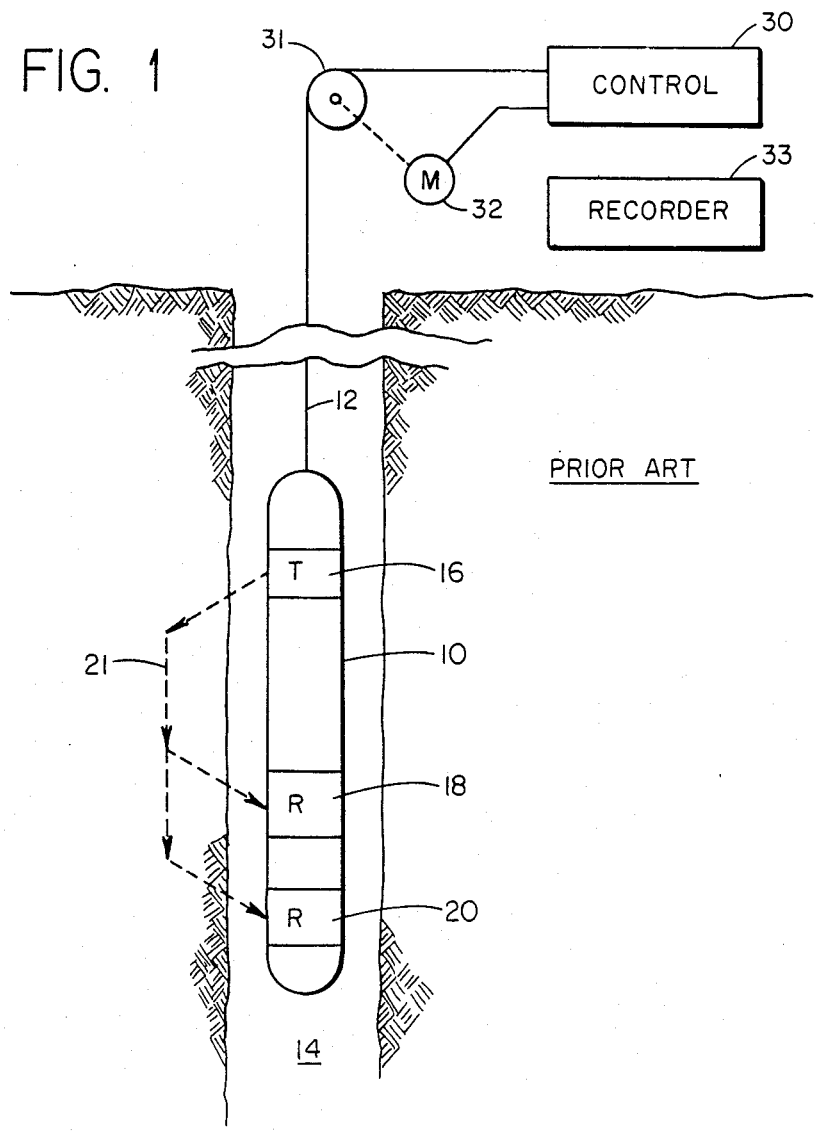
PRIOR ART
FIG. 2  TYPICAL RECEIVED SIGNALS
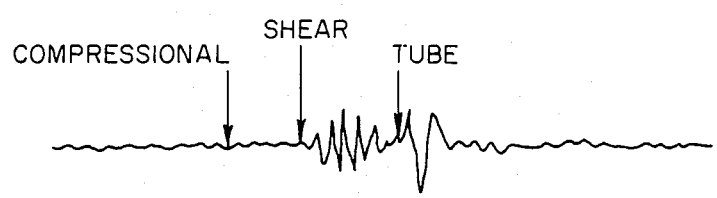

DETERMINATION OF FORMATION PERMEABILITY FROM AN ACOUSTIC LOG

BACKGROUND OF THE INVENTION

The present invention relates in general to a method for acoustic well-logging and more particularly it relates to a method for determining subterranean formation permeability from acoustic tube wave energy.

It is well-known that measurements of the conductivity and porosity of a formation are important in determining whether hydrocarbons are located therein, the hydrocarbon being found as non-conductive fluids in porous rock formations. It is also well-known that hydrocarbons are generally not extractable from porous rock formations unless those formations are also permeable. Accordingly, after hydrocarbons are detected, it has been generally the practice to obtain a sidewall core of a given formation in order to measure permeability in the laboratory. Such a technique is time consuming and unduly expensive.

Techniques of acoustic well-logging are also well known and the possible applicability of such techniques to the determination of the permeability of a formation was predicted by Rosenbaum in the article "Synthetic Microseismograms: Logging In Porous Formations", *Geophysics*, Volume 39 No. 1 (February, 1974).

Rosenbaum investigated numerically, the ideal case of a borehole filled with an inviscid fluid surrounded by a formation that is porous and which conforms to Biot's theory as set forth in "Propagation of Elastic Waves In A Cylindrical Bore Containing A Fluid", *Journal of the Acoustic Society of America*, Volume 23, 1952, pages 997–1005. Rosenbaum's investigation showed that the effect of the pore-fluid mobility on the calculated response is large and can be measured with an appropriate logging tool. He further predicted that the relative amplitude of a tube wave obtained from an acoustic logging tool with a wide band frequency response would depend upon the permeability of the formation.

One such acoustic logging tool utilized in the determination of formation permeability is described in U.S. Pat. No. 4,432,077 to Alhilali and Zemanek, Jr. As the logging tool traverses a borehole, a low frequency acoustic source transmits acoustic energy through the formations surrounding the borehole. A spaced apart receiver measures such acoustic energy at a plurality of locations along the borehole. Changes in amplitude of acoustic tube waves are observed from one of a plurality of locations in the borehole with respect to another of such locations. A change in tube wave amplitude gives a measure of formation permeability. More particularly, a pair of spaced-apart receivers may be utilized wherein the ratio of the tube wave amplitude measured by one of the detectors to the tube wave amplitude measured by the other of the detectors is observed at each of a plurality of locations in the borehole. A change in such ratio also provides a measure of formation permeability.

Another such acoustic logging tool utilized in the determination of formation permeability is described in U.S. Pat. No. 4,575,828 to Williams. The amplitude and travel time relationships of tube waves detected by a pair of spaced apart receivers within the logging tool are recorded as the tool traverses at least along an identified location of a naturally fractured formation. Total permeability of the naturally fractured formation is estimated in accordance with a predetermined correlation between permeability and the recorded tube wave amplitude relationship. Matrix permeability of the naturally fractured formation is estimated in accordance with a predetermined correlation between permeability and the recorded tube wave travel time relationship. That portion of the estimated total formation permeability that is attributable to the naturally occurring fractures in the formation is identified by the difference between such estimated total formation permeability and said estimated matrix permeability. In a further aspect, the recording of the amplitude relationship between tube waves detected by the pair of spaced-apart receivers includes the recording of the ratio of the tube wave amplitudes. The recording of the travel time relationship between the pair of spaced-apart receivers includes the recording of the difference of the tube wave travel times. Total formation permeability is estimated from a predetermined correlation established between recordings of permeability taken from core samples adjacent a naturally fractured formation in a select borehole and the ratio of tube wave amplitudes measured across the naturally occurring fractures by a pair of spaced-apart receivers in such select borehole. Matrix permeability is estimated from a predetermined correlation established between recordings of permeability taken from core samples adjacent a naturally fractured formation in a select borehole and the difference of the tube wave travel times across the naturally occurring fractures by a pair of spaced-apart receivers in such select borehole.

While such acoustic logging tools have been utilized in the determination of formation permeability, a need still exists for improved techniques of processing the measured acoustic energy signals for more accurate determinations of such permeability.

SUMMARY OF THE INVENTION

The present invention is directed to a method for uniquely determining the permeability of subsurface formations surrounding a borehole from acoustic tube wave energy. Such formations are traversed with a borehole logging tool having an acoustic transmitter and a pair of spaced-apart acoustic receivers. The transmitter is pulsed at a plurality of locations along the borehole to produce acoustic energy. At each receiver, the acoustic energy is detected after it has passed through the formations surrounding the borehole in traveling from the transmitter to the receiver. The energy of tube waves contained within the received acoustic energy is measured for each receiver. An impermeable zone in said formation is identified and its density determined.

Utilizing a measured relationship between rock density and tube wave energy ratio, a tube wave energy ratio for the impermeable zone is determined. A tube wave energy is then predicted for a first of the pair of receivers by multiplying the measured energy of tube waves for the second of the pair of receivers by the determined tube wave energy ratio. The measured tube wave energy for the first of the receivers is then corrected by a factor derived from a defined relationship between the measured tube wave energy for the first receiver and the predicted tube wave energy for such first receiver. Next, a calibrated tube wave energy ratio is determined from the measured tube wave energy for the second of the receivers and the predicted tube wave energy for the first of the receivers. Finally, formation permeability is determined from the calibrated tube wave energy ratio in accordance with a measured relationship between permeability and tube wave energy ratio.

In one aspect of the invention, the step of correcting the measured tube wave energy may be carried out by generating a correction factor for the impermeable zone by subtracting the predicted tube wave energy from the measured tube wave energy, determining an error factor by taking the average of the correction factor, and determining a calibrated tube wave energy by subtracting the error factor from the measured tube wave energy.

In another aspect of the invention, the step of correcting the measured tube wave energy may be carried out by generating a correction factor for the impermeable zone by taking the ratio of the predicted tube wave energy to the measured tube wave energy, determining an error factor by taking the average of the correction factor, and determining a calibrated tube wave energy by multiplying the measured tube wave energy by the error factor.

BRIEF DESCRIPTION OF THE DRAWINGS

FIG. 1 is a diagrammatic illustration of a borehole logging system employed to measure acoustic energy travel through subsurface formations surrounding a borehole.

FIG. 2 illustrates a typical acoustic waveform that might be recorded by the borehole logging system of FIG. 1.

DESCRIPTION OF THE PREFERRED EMBODIMENT

Figure 3:
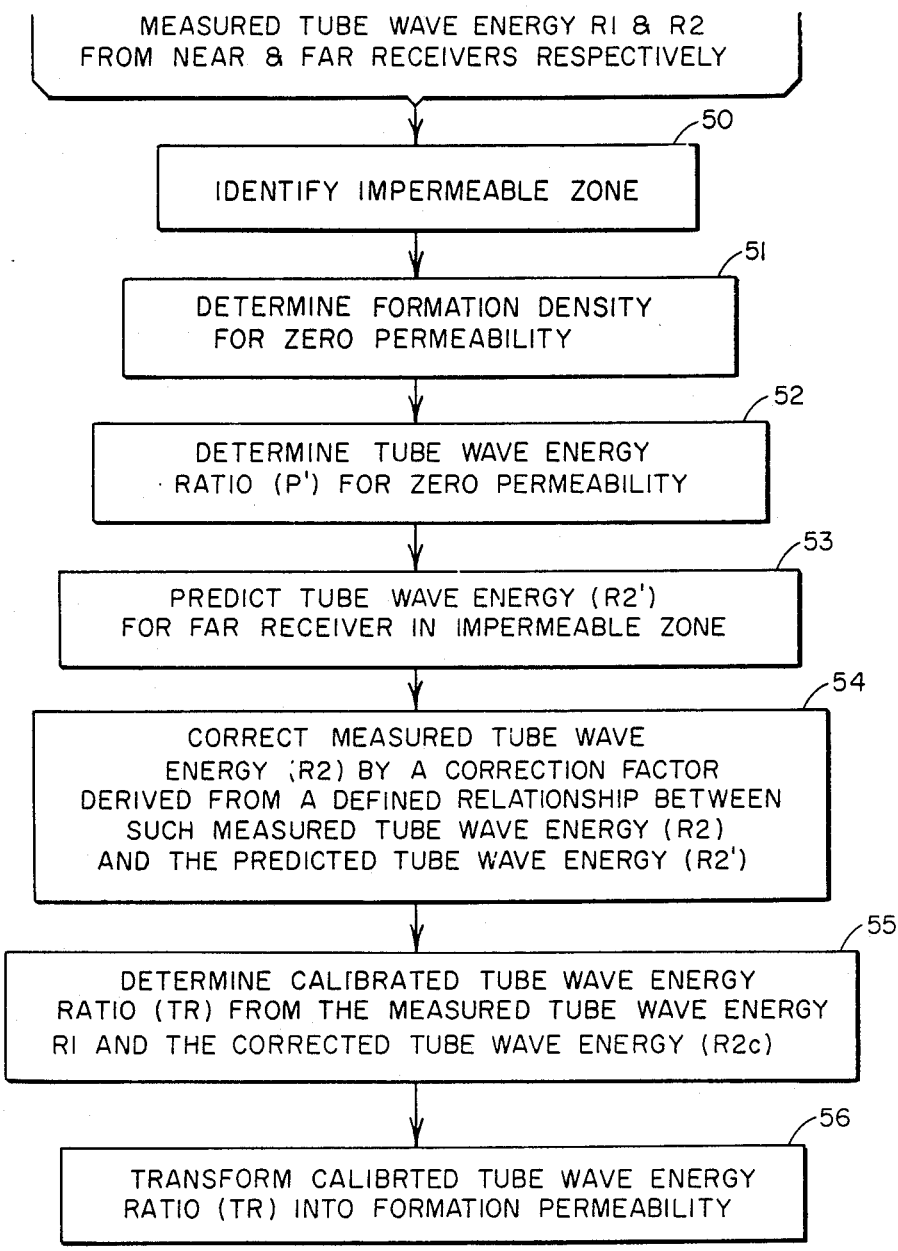
FIG. 3 is a flow chart of the method of the present invention of using acoustic energy, such as recorded in FIG. 2 by the borehole logging system of FIG. 1, to identify formation permeability.

The method of the present invention may be carried out by means of a conventional acoustic borehole logging system. A preferred embodiment of such an acoustic logging system consists of a single transmitter and a pair of receivers as illustrated in FIG. 1. The logging tool 10 is suspended by cable 12 for movement along the length of the borehole 14. The logging tool includes an acoustic source or transmitter 16 for the production of repetitive time-spaced pulses of acoustic energy. A pair of spaced-apart receivers 18 and 20, respond to frequencies between about 0.1 KHz and 30 KHz, to sense each of the generated acoustic pulses and converts them into representative electrical signals R1 and R2 for the near receiver 18 and far receiver 20 respectively. An exemplary signal output for one of such receivers is illustrated in FIG. 2. The waveform of FIG. 2 is shown to comprise a wavetrain, including several separately identifiable events. The uphole components include a surface control panel 30 to which the cable 12 is directed over the sheave 31. A motor 32, which is controlled from the surface control panel 30, operates the sheave 31 for raising and lowering the logging tool 10 in the borehole 14. An output means, such as a digital recorder 33, is electrically connected to the surface control panel for recording and/or displaying the date detected from the logging tool 10.

A first arriving event is the compressional wave which represents acoustic energy which has been refracted through the formation adjacent the wellbore as, for example, by way of path 21. The compressional wave travels as a fluid pressure wave in the wellbore mud from the transmitter to the formation where it travels at the compressional wave velocity of the particular formation. The compressional wave then travels to the receiver through the wellbore mud as a fluid pressure wave.

The second arriving event is the shear wave which is also refracted by way of path 21 through the formation adjacent the wellbore. Unlike the compressional wave, the shear wave travels at shear velocity through the formations. The particles of the formation along the path of propagation are vibrated in a direction perpendicular to the direction of the propagation of the wave.

The third arriving event is the tube wave which causes a radial bulging and contraction of the borehole and its travel is, therefore, associated with the borehole wall, that is, the boundary between the borehole fluids and the formation solids.

For a more detailed description of such a borehole logging tool, including the configurations of the transmitter and receivers, reference may be made to the aforementioned U.S. Pat. Nos. 4,432,077 and 4,575,82, the teachings of which are incorporated herein by reference.

Having described the borehole logging tool as shown in FIG. 1, as well as in the aforementioned U.S. patents, the method of the present invention for using acoustic tube wave energy in the recorded signals R1 and R2 from the pair of spaced-apart receivers to identify permeability of a subsurface formation will now be described in conjunction with the flow chart of FIG. 3.

Figure 4:
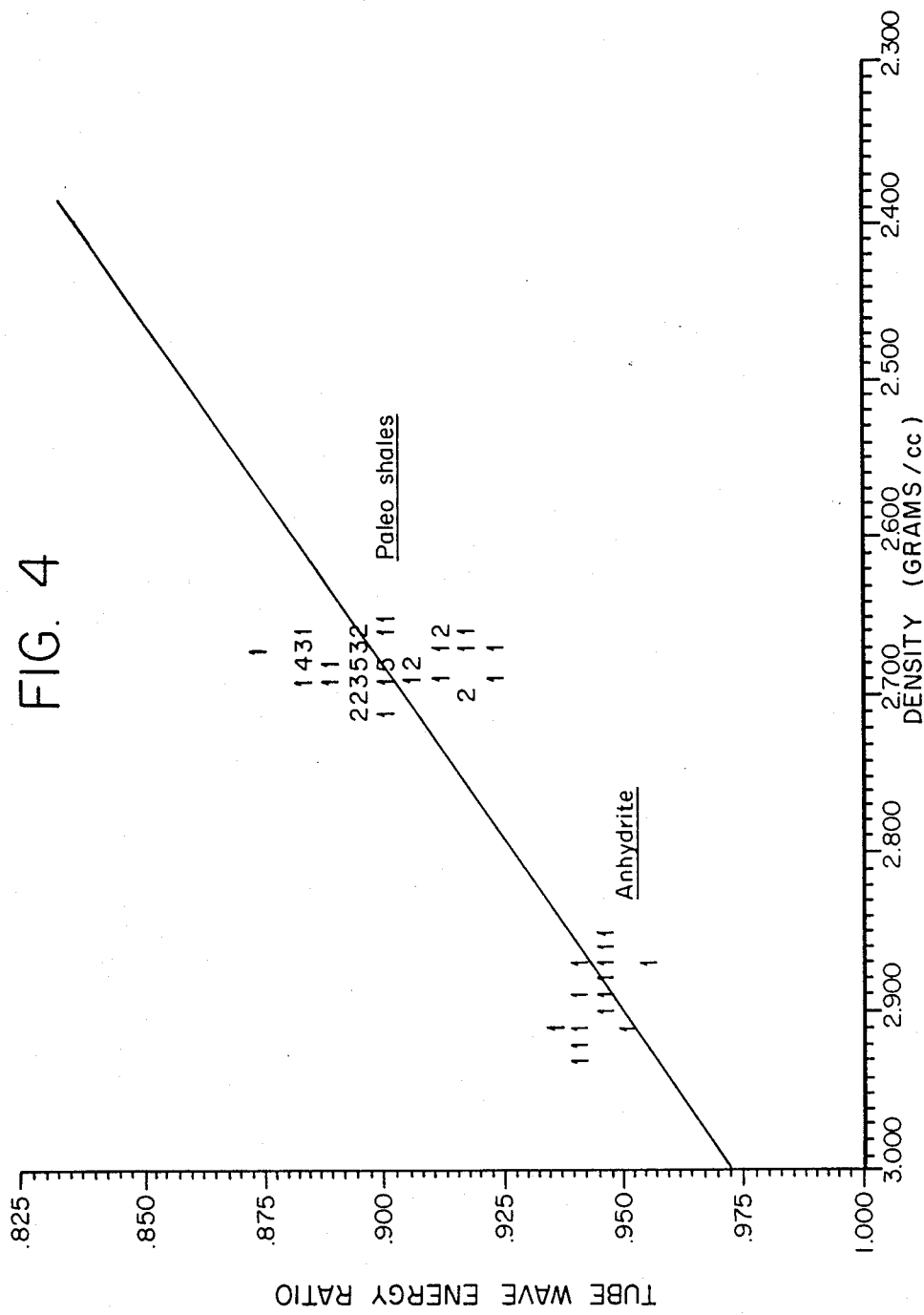
FIGS. 4-6 are graphical representations of recorded data useful in carrying out the steps of the present invention as illustrated in the flow chart of FIG. 3.

Initially at step 50 an impermeable zone of a subsurface formation is identified from a porosity log, such as a density log, by identifying a zero porosity rock using a conventional porosity tool. It is assumed that near zero porosity is approximately equal to zero permeability, while greater than zero porosity may or may not be zero permeability. Identifying an impermeable zone is important for the calibration of energy curves. A density log is used as a reference value in the impermeable zone because it is widely used as a porosity tool and is available for most wells. Formation density is determined at step 51 for zero permeability. A density log at zero porosity reads very close to the matrix density. The average density of the zero porosity interval is used as the density value for zero permeability. A tube wave energy ratio P' is determined for zero permeability at step 52 using a crossplot of density versus tube wave energy ratio such as shown in FIG. 4. Values used in the crossplot in an impermeable interval are regressive coefficients where m is the intercept and b is the slople. For the crossplot of FIG. 4, the value m is 0.23684 and the value b is 0.264474. At step 53 a tube wave energy R2' for the far receiver 20 in the impermeable zone is determined by multiplying the measured tube wave energy R1 for the near receiver 18 by the determined tube wave energy ratio:

$$R2' = R1 \times P' \quad (1)$$

The value of R2' is the predicted tube wave energy for the far receiver 20 in the impermeable zone with the acoustic energy signal R1 from the near receiver 18 as a reference and P' as a constant. At step 54, the measured tube wave energy R2 is corrected by a correction factor derived from a defined relationship between such measured tube wave energy R2 and the predicted tube wave energy R2' in the impermeable zone. This relationship may be based on either the difference or the ratio of the two energies. Firstly, step 54 may be carried out using a correction factor based on a difference relationship of R2 and R2' as will now be described.

A correction factor ER is generated for the impermeable zone by subtracting the predicted tube wave energy R2 from the measured tube wave energy R2:

$$ER = R2 - R2' \qquad (2)$$

An error factor $\overline{ER}$ is determined as the average of the correction factor ER. A calibrated tube wave energy R2c is determined for the receiver 20 by subtracting the error factor $\overline{ER}$ from the tube wave energy R2:

$$R2c = R2 - \overline{ER} \qquad (3)$$

Secondly, step 54 may be carried out using a correction factor based on a ratio relationship of R2 and R2' as will now be described. A correction factor ER is generated for the impermeable zone by taking the ratio of the predicted tube wave energy R2' to the measured tube wave energy R2:

$$ER = R2'/R2 \qquad (4)$$

An error factor $\overline{ER}$ is determined as the average of the correction factor ER. A calibrated tube wave energy R2c is determined for the far receiver 20 by multiplying the measured tube wave energy R2 by the error factor $\overline{ER}$:

$$R2c = R2 \times \overline{ER} \qquad (5)$$

Next, at step 55, a calibrated tube wave energy ratio TR is determined from the ratio of the calibrated tube wave energy R2c for the far receiver 20 and the measured tube wave energy R1 for the near receiver 18:

$$TR = R2c/R1 \qquad (6)$$

Figure 5:
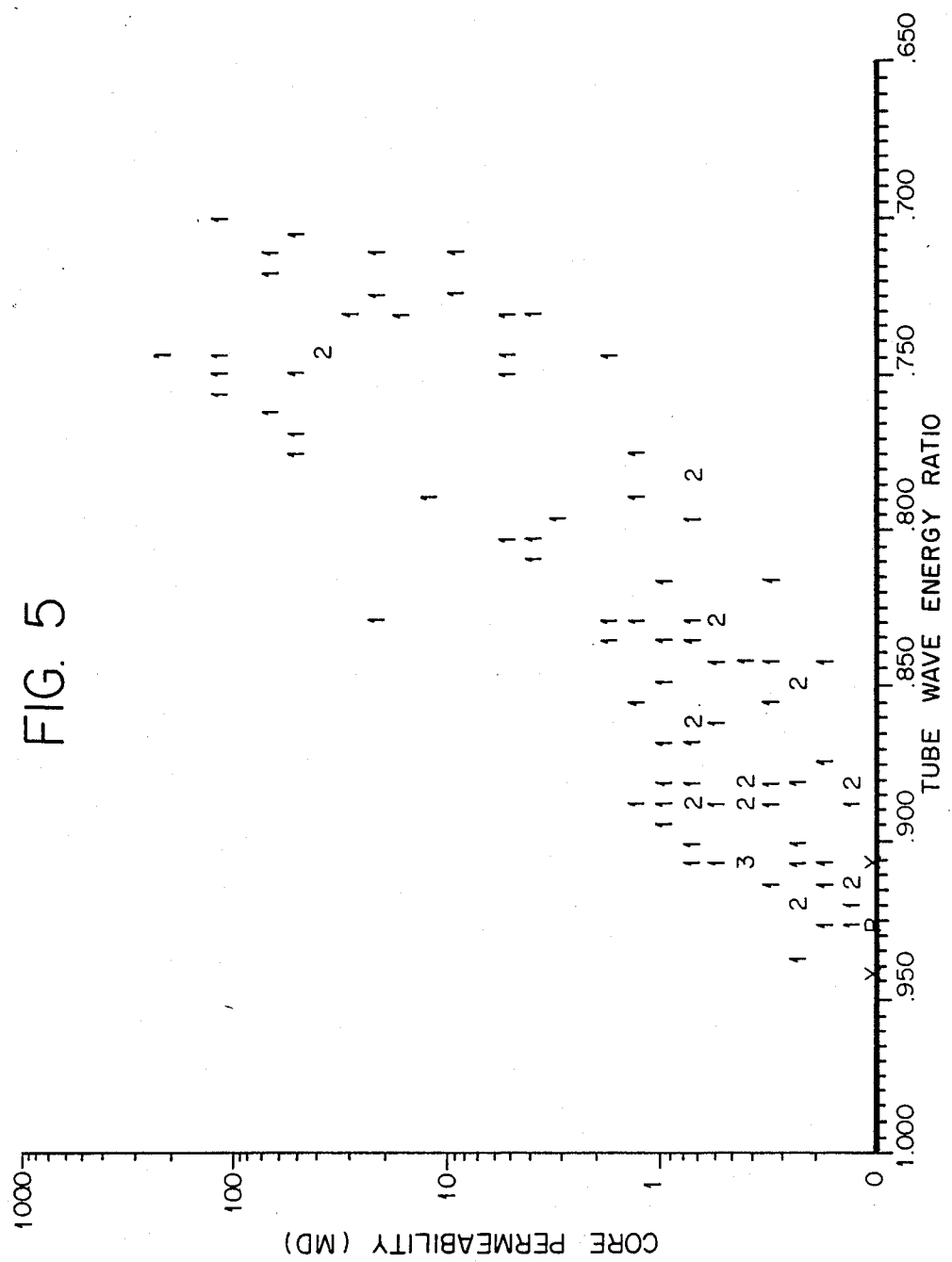

Using a chart like that shown in FIG. 5 relating core permeability to tube wave energy ratio, step 56 transforms the calibrated energy ratio TR into formation permeability. For the data points shown in FIG. 5, m is $-13.636364$ and b is 11.590909.

Figure 6:
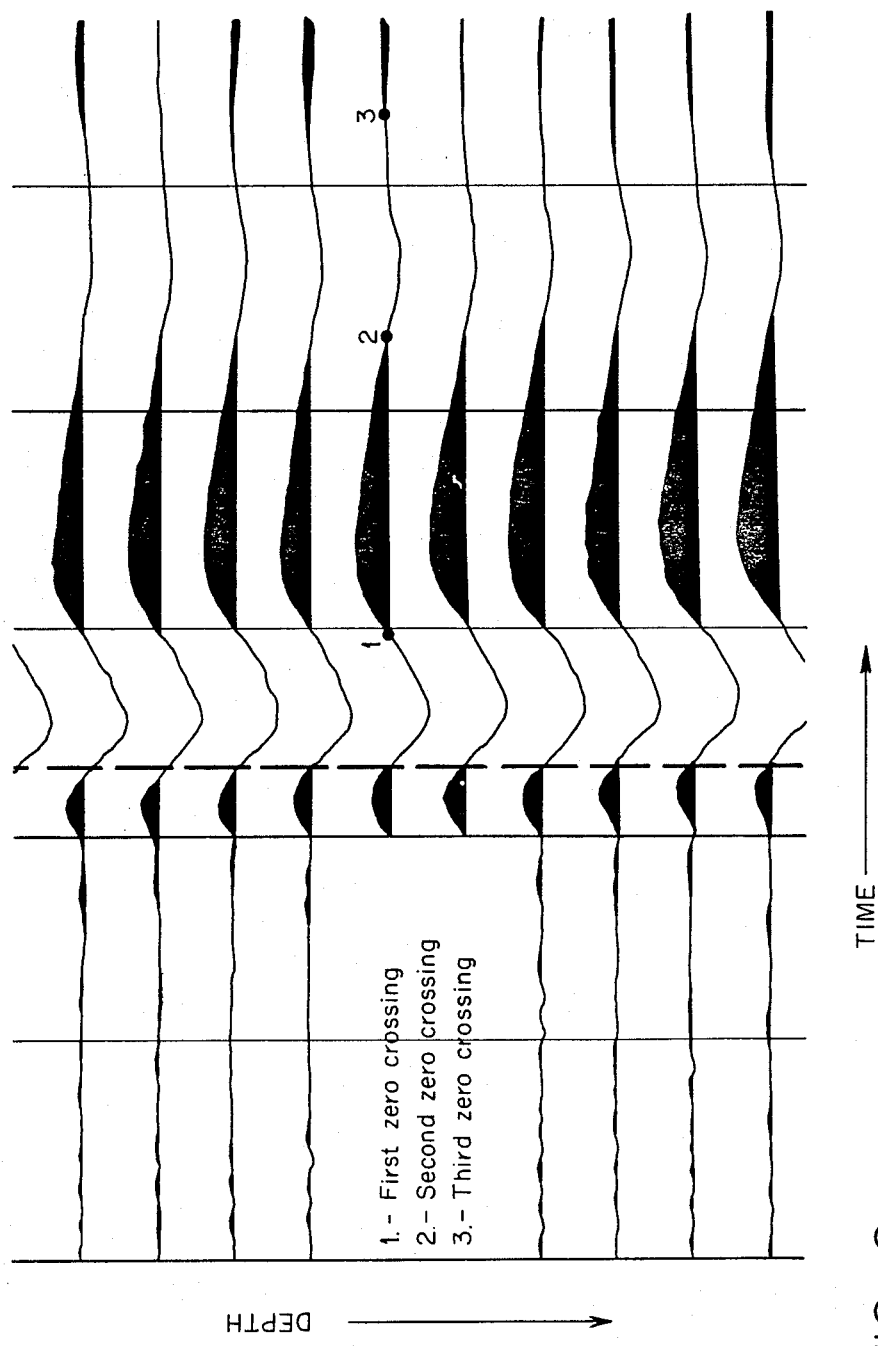

In using tube wave energy in the flow chart of FIG. 3, two kinds of energy curves may be employed. As shown in FIG. 6, a full energy curve is from the first to the third zero crossing points (i.e. points 1 and 3 respectively) and a half energy curve is from the first to the second zero crossing points (i.e. points 1 and 2 respectively). Energy of an event is the summation of the squared amplitude of each sample divided by the number of samples. Full energy curves are preferred for use in practicing the method of the present invention, but half energy curves still yield satisfactory results. Data quality can be checked by plotting the tube wave energy curves of both receivers on the same track. Quality problems will be indicated by different appearances of the two curves. For example, if one curve is spiky and the other is smooth, the third zero crossing was not located. Different trends when one curve increases while the other decreases is another indication of data quality problems. In both cases, the tube wave signals should be filtered to remove high frequencies that might interfere with the tube waves. In some cases, geographical location suggests a permeability/porosity correlation. If the energy ratio curve does not have a similar character to the porosity curve, there is possibly mud invasion or other formation damage.

While the foregoing preferred embodiment of the method of the present invention has been described and illustrated, numerous modifications or alterations may be made without departing from the spirit and scope of the invention as set forth in the appended claims.

I claim:

1. A method for determining the permeability of formations surrounding a borehole, comprising the steps of:
    (a) traversing the formations surrounding a borehole with a logging tool having a means for transmitting acoustic energy,
    (b) pulsing said transmitting means at a plurality of locations in said borehole to produce acoustic energy therein,
    (c) detecting for each location said produced energy at a pair of spaced-apart acoustic receivers,
    (d) measuring the energy of tube waves detected by said receivers for each location,
    (e) identifying an impermeable zone in said formation,
    (f) identifying the density of the impermeable zone of said formation,
    (g) determining a tube wave energy ratio for said impermeable zone from a crossplot relating density to tube wave energy ratio as measured in zones of zero porosity,
    (h) predicting tube wave energy for a second of said pair of receivers by multiplying the energy of tube waves measured in step (d) for the first of said pair of receivers by said tube wave energy ratio determined in step (g) for said impermeable zone,
    (i) correcting the tube wave energy measured in step (d) for said second of said receivers by a correction factor derived from a defined relationship between the tube wave energy measured in step (d) for said second of said receivers and said tube wave energy predicted in step (h) for said second of said receivers,
    (j) determining a calibrated tube wave energy ratio from the tube wave energy measured in step (d) for said first of said receivers and the measured tube wave energy for said second of said receivers corrected in step (i) by said correction factor, and
    (k) determining formation permeability from the tube wave energy ratio calibrated in step (j) in accordance with a crossplot relating core permeability to tube wave energy ratio.

2. The method of claim 1 wherein step (i) of correcting the tube wave energy measured for said second of said receivers comprises the steps of:
    (a) generating a correction factor for the impermeable zone by subtracting the tube wave energy predicted in step (h) for said second of said receivers from the tube wave energy measured in step (d) for said second of said receivers,
    (b) determining an error factor by taking the average of the correction factor, and
    (c) determining a calibrated tube wave energy for said first of said receivers by subtracting said error factor from the tube wave energy measured in step (d) for said second of said receivers.

3. The method of claim 1 wherein step (i) of correcting the tube wave energy measured for said second of said receivers comprises the steps of:
   (a) generating a correction factor for the impermeable zone by taking the ratio of the tube wave energy predicted in step (h) for said second of said receivers to the tube wave energy measured in step (d) for said second of said receivers,
   (b) determining an error factor by taking the average of the correction factor, and
   (c) determining a calibrated tube wave energy for said first of said receivers by multiplying the tube wave energy measured in step (d) for said second of said receivers by said error factor.

4. A method for determining the permeability of formations surrounding a borehole, comprising the steps of:
   (a) traversing the formations surrounding a borehole with a logging tool having a means for transmitting acoustic energy,
   (b) pulsing said transmitting means at a plurality of locations in said borehole to produce acoustic energy therein,
   (c) detecting for each location said produced energy at a pair of spaced-apart first and second acoustic receivers,
   (d) measuring the energies R1 and R2 of tube waves detected by said first and second receivers respectively for each location,
   (e) identifying an impermeable zone in said formation,
   (f) identifying the density of the impermeable zone of said formation,
   (g) determining a tube wave energy ratio P' for said impermeable zone from a crossplot relating density to tube wave energy ratio as measured in zones of zero porosity,
   (h) predicting tube wave energy R2' for a second of said pair of receivers by multiplying the measured energy R1 of tube waves for the first of said pair of receivers by said tube wave energy ratio P':

$$R2' = R1 \times P'$$

(i) generating a correction factor ER for the impermeable zone by subtracting the predicted tube wave energy R2' for said second of said receivers from the measured tube wave energy R2 for said second of said receivers:

$$ER = R2 - R2',$$

(j) determining an error factor $\overline{ER}$ by taking the average of the correction factor,
   (k) determining a calibrated tube wave energy R2c for said second of said receivers by subtracting said error factor $\overline{ER}$ from the measured tube wave energy R2 for said second of said receivers:

$$R2c = R2 - \overline{ER},$$

(l) determining a calibrated tube wave energy ratio TR by dividing said corrected measured tube wave energy R2c for said second of said receivers by said measured tube wave energy R1 for said first of said receivers:

$$TR = R2c/R1, \text{ and}$$

(m) determining formation permeability from said calibrated tube wave energy ratio TR in accordance with a crossplot relating core permeability to tube wave energy ratio.

5. A method for determining the permeability of formations surrounding a borehole, comprising the steps of:
   (a) traversing the formations surrounding a borehole with a logging tool having a means for transmitting acoustic energy,
   (b) pulsing said transmitting means at a plurality of locations in said borehole to produce acoustic energy therein,
   (c) detecting for each location said produced energy at a pair of spaced-apart first and second acoustic receivers,
   (d) measuring the energies R1 and R2 of tube waves detected by said first and second receivers respectively for each location,
   (e) identifying an impermeable zone in said formation,
   (f) identifying the density of the impermeable zone of said formation,
   (g) determining a tube wave energy ratio P' for said impermeable zone from a crossplot relating density to tube wave energy ratio as measured in zones of zero porosity,
   (h) predicting tube wave energy R2' for a second of said pair of receivers by multiplying the measured energy R1 of tube waves for the first of said pair of receivers by said tube wave energy ratio P':

$$R2' = R1 \times P'$$

(i) generating a correction factor ER for the impermeable zone by dividing the predicted tube wave energy R2' for said second of said receivers from the measured tube, wave energy R2 for said second of said receivers:

$$ER = R2'/R2,$$

(j) determining an error factor $\overline{ER}$ by taking the average of the correction factor,
   (k) determining a calibrated tube wave energy R2c for said second of said receivers by multiplying said error factor $\overline{ER}$ by the measured tube wave energy R2 for said second of said receivers, $$R2c = R2 \times \overline{ER},$$

(l) determining a calibrated tube wave energy ratio TR by dividing said corrected measured tube wave energy R2c for said second of said receivers by said measured tube wave energy R1 for said first of said receivers:

$$TR = R2c/R1, \text{ and}$$

(m) determining formation permeability from said calibrated tube wave energy ratio TR in accordance with a crossplot relating core permeability to tube wave energy ratio.

\* \* \* \* \*